: 3,280,185
3-SUBSTITUTED 1,2,4-CYCLOPENTANETRIONE, 1-THIOSEMICARBAZONES

Gerhard R. Wendt, Havertown, and Kurt W. Ledig, Philadelphia, Pa., assignors to American Home Products Corporation, New York, N.Y., a corporation of Delaware
No Drawing. Filed Oct. 1, 1965, Ser. No. 492,273
4 Claims. (Cl. 260—552)

This invention relates to novel 3-substituted 1,2,4-cyclopentanetrione, 1-thiosemicarbazones and to a method of making the same.

The claimed compounds show activity as anti-inflammatory agents and as central nervous system depressants.

The compounds and the process of the claimed invention can be readily understood from a consideration of the following reaction scheme:

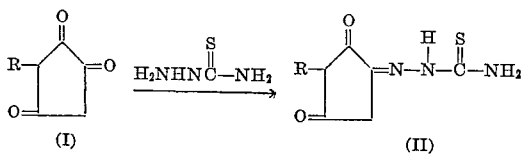

In the above formulas, the symbol R is intended to represent straight chained or branched lower alkyl groups having from 1 to 5 carbon atoms in the hydrocarbon chain; dialkylaminoalkyl groups,

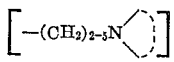

phenyl, and phenyl substituted in any given position by at least one alkyl, alkoxy or halo group; and aralkyl group such as benzyl.

The claimed compounds are prepared by dissolving a known 3-substituted-1,2,4-cyclopentanetrione in water, adding sodium acetate buffer thereto, hydrochloric acid and thiosemicarbazone. The resulting reaction mixture is stirred at room temperature for about 6 hours at which time the product precipitates. This procedure may be accelerated by warming the reaction mixture over a steam bath or by using a hot solution of thiosemicarbazide in water. In these latter two instances, it is not necessary to use an acid media.

The product generally can be purified by recrystalizing from alcohol or dimethyl formamide (DMF).

The claimed compounds can be formulated conventionally in unit dosage forms by compounding them with known inert carriers. When so administered by oral or intraperitoneal routes in doses of from 5 to 200 mg./kg. of body weight, the compounds of the invention will moderate and alleviate inflammatory disorders. Moreover, their utility, in addition to the specific areas noted, also extends to the area of veterinary medicine as well as experimental pharmacology.

The following examples will serve to further illustrate the invention in its various product and process aspects. These several examples are purely exemplary of the invention and are not intended to limit its concept in any manner.

EXAMPLE 1

*3-methyl-1,2,4-cyclopentanetrione, 1-thiosemicarbazone*

An aqueous solution (1.5 liter) of 30 g. of 3-methyl-1,2,4-cyclopentanetrione was treated with 90 g. of sodium acetate, 800 ml. of 2 N hydrochloric acid and a solution of 30 g. of thiosemicarbazone in 500 ml. of water. The reaction mixture was stirred for 6 hours at room temperature and the resulting precipitate recrystallized from DMF-alcohol to yield 47.0 g. of the title compound; M.P. 265° dec.

Elemental analysis confirmed the empirical formula for $C_7H_9N_3O_2S$.

EXAMPLE 2

*3-propyl-1,2,4-cyclopentanetrione, 1-thiosemicarbazone*

An aqueous solution (100 ml.) of 2.0 g. of 3-propyl-1,2,4-cyclopentanetrione was treated with a solution of 1.5 g. of thiosemicarbazide in 50 ml. of water on the steam bath for 3 hours. The precipitate which had been obtained on cooling was recrystallized from alcohol to give 2.5 g. of the title compound; M.P. 260° dec.

Elemental analysis confirmed the empirical formula for $C_9H_{13}N_3O_2S$.

EXAMPLE 3

*3-phenyl-1,2,4-cyclopentanetrione, 1-thiosemicarbazone*

A solution of 5.0 g. of 3-phenyl-1,2,4-cyclopentanetrione was reacted with a hot solution of 2.4 g. of thiosemicarbazide in 50 ml. of water. The precipitate was filtered and recrystallized from N,N-dimethylformamide to give the title compound; M.P. 251° dec.

Elemental analysis confirmed the empirical formula for $C_{12}H_{11}N_3O_2S$.

EXAMPLE 4

*3-(2-dimethylaminoethyl)-1,2,4-cyclopentanetrione, 1-thiosemicarbazone*

Using a molar equivalent of 3-(diethylaminoethyl)-1,2,4-cyclopentanetrione in place of 3-methyl-1,2,4-cyclopentanetrione as in Example 2 the product of this example may be obtained.

What is claimed is:
1. A compound of the formula:

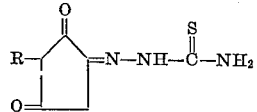

wherein R is lower alkyl, phenyl or 2-diethylaminoethyl.
2. 3-methyl - 1,2,4 - cyclopentanetrione, 1-thiosemicarbazone.
3. 3 - propyl - 1,2,4 - cyclopentanetrione, 1-thiosemicarbazone.
4. 3 - phenyl - 1,2,4 - cyclopentanetrione, 1-thiosemicarbazone.

No references cited.

ALEX MAZEL, *Primary Examiner.*

HENRY R. JILES, *Assistant Examiner.*